(12) United States Patent
Hung

(10) Patent No.: US 7,961,973 B2
(45) Date of Patent: Jun. 14, 2011

(54) LENS ROLL-OFF CORRECTION METHOD AND APPARATUS

(75) Inventor: Szepo (Bob) Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1059 days.

(21) Appl. No.: 11/054,079

(22) Filed: Feb. 8, 2005

(65) Prior Publication Data

US 2006/0056082 A1    Mar. 16, 2006

Related U.S. Application Data

(60) Provisional application No. 60/607,026, filed on Sep. 2, 2004.

(51) Int. Cl.
| | |
|---|---|
| G06K 9/00 | (2006.01) |
| G06K 9/38 | (2006.01) |
| G06K 9/40 | (2006.01) |
| H04N 5/235 | (2006.01) |
| H04N 5/228 | (2006.01) |
| H04N 5/262 | (2006.01) |

(52) U.S. Cl. ........ 382/274; 382/100; 382/270; 382/275; 348/222.1; 348/240.99

(58) Field of Classification Search ................ 348/222.1; 382/274

See application file for complete search history.

(56) References Cited

U.S. PATENT DOCUMENTS

| | | | |
|---|---|---|---|
| 5,047,861 | A | 9/1991 | Houchin et al. |
| 2003/0156204 | A1 | 8/2003 | Sato et al. |
| 2003/0234864 | A1 | 12/2003 | Matherson et al. |
| 2004/0032952 | A1 | 2/2004 | Pinto et al. |
| 2004/0095611 | A1* | 5/2004 | Watanabe et al. ............ 358/3.26 |
| 2004/0155970 | A1* | 8/2004 | Johannesson et al. ..... 348/231.6 |
| 2004/0257454 | A1* | 12/2004 | Pinto et al. .................. 348/222.1 |
| 2005/0105822 | A1* | 5/2005 | Narita ........................... 382/275 |

(Continued)

FOREIGN PATENT DOCUMENTS

EP    1447977    8/2004

OTHER PUBLICATIONS

Wonpil Yu (2003) An embedded camera lens distortion correction method for mobile computing applications. IEEE Transactions on Consumer Electronics, vol. 49, No. 4, pp. 894-901.

(Continued)

*Primary Examiner* — Vu Le
*Assistant Examiner* — Nathan Bloom
(74) *Attorney, Agent, or Firm* — Kyana Macek; James R. Gambale, Jr.

(57) ABSTRACT

Brightness and color tone shift distortion of captured images by a non-ideal lens can be compensated by applying an inverse transfer function to the captured image. An estimate of the lens transfer function can be measured based on a radius from a center of the lens. The lens transfer function can be measured by capturing a flat field image. The center of the lens can be determined based on a relative brightness maximum. The relative brightness of the captured flat field image can then be measured as a function of radius to generate a lens response curve. Separate response curves can be measured for each color component. A correction curve can be determined as the inverse of the response curve. The correction curve can be applied to subsequent captured images to compensate for lens degradation.

30 Claims, 6 Drawing Sheets

U.S. PATENT DOCUMENTS

2009/0059041 A1* 3/2009 Kwon .......................... 348/241
2009/0284642 A1* 11/2009 Ichikawa ..................... 348/347

OTHER PUBLICATIONS

International Search Report, PCT/US05/031054, International Search Authority, European Patent Office, Jan. 5, 2006.

Written Opinion, PCT/US05/031054, International Search Authority, European Patent Office, Jan. 5, 2006.

International Preliminary Report on Patentability, PCT/US05/031054, International Preliminary Examining Authority, United States, Mar. 6, 2007.

* cited by examiner

LENS ROLL-OFF CORRECTION METHOD AND APPARATUS

CROSS-REFERENCES TO RELATED APPLICATIONS

This application claims the benefit of U.S. Provisional Application No. 60/607,026, filed Sep. 2, 2004, entitled Lens Roll Off Correction; which is hereby incorporated herein by reference in its entirety.

BACKGROUND OF THE DISCLOSURE

Miniaturization of electronic components, increases in processing capabilities, and decreases in the cost of electronic components enable consumer electronic devices to implement a variety of features and abilities. Telephones that previously were tethered to wire lines now commonly take the form of wireless devices that provide a user with the capabilities to communicate from virtually anywhere.

Wireless phones themselves have evolved to include numerous features and abilities not available in models from just a few years ago. It is now common for wireless telephones to have the ability to take digital pictures and transmit the pictures to networked devices, such as personal computers.

A challenge for designers of modern electronic devices is to provide an equal or greater level of complexity that consumers are accustomed to receiving in a device while simultaneously reducing the price. Typically, a designer is presented with one or more models or suppliers for any particular component implemented within a device. However, a lower cost component may provide a lower level of performance.

The lower level of performance may exhibit itself in any of a variety of measures. For example, a lower priced component may have reduced durability or lifespan compared to a higher priced component. Similarly, a lower priced component may only be capable of providing lower performance. For example, lower cost processors may not have the ability to provide the same processing speed as a higher priced processor. Similarly, a low priced display may not have the resolution of a higher priced display.

Ideally, the designer is able to select sufficiently low cost items that minimize the cost to the consumer for the finished electronic device while providing substantially the same value to the consumer as a comparable electronic device implementing higher priced components. To further complicate the analysis, the value and performance attributed to an electronic device is not measured purely by objective criteria, but may be affected by consumer perception.

SUMMARY

Brightness and color tone shift distortion of captured images by a non-ideal lens can be compensated by applying an inverse transfer function to the captured image. An estimate of the lens transfer function can be measured based on a radius from a center of the lens. The lens transfer function can be measured by capturing a flat field image. The center of the lens can be determined based on a relative brightness maximum. The relative brightness of the captured flat field image can then be measured as a function of radius to generate a lens response curve. Separate response curves can be measured for each color component. A correction curve can be determined as the inverse of the response curve. The correction curve can be stored as a polynomial function, a plurality of piecewise continuous polynomial functions, or a plurality of linear approximations. The correction curve can be applied to subsequent captured images to compensate for lens degradation.

The disclosure includes a method of correcting lens roll-off degradation, including capturing an image, generating a correction table based in part on the image, and correcting the lens roll-off degradation of a subsequent image based in part on the correction table.

The disclosure also includes a method of correcting lens roll-off degradation, including determining a correction table, capturing a digital image, sampling a pixel value from the digital image, determining a correction factor based on the correction table, and applying the correction factor to the pixel.

The disclosure also includes an apparatus configured to correct a lens roll-off degradation, including a lens, a sensor positioned relative to the lens and configured to capture an image incident to the lens, and an image processor coupled to the sensor and configured to correct the lens roll-off by sampling pixels from the image, determining a correction factor corresponding to each of the pixels; and applying the correction factor to the pixels.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE EMBODIMENTS

Figure 1A:
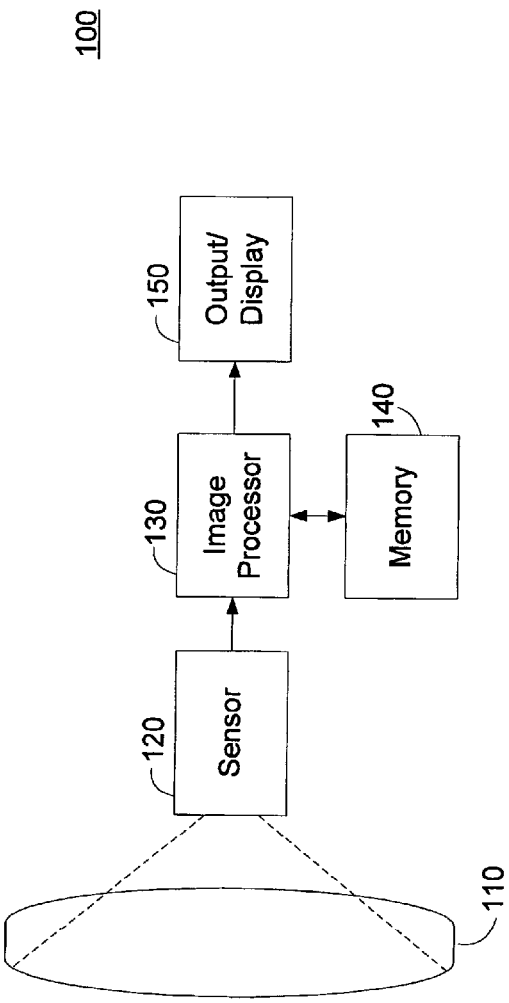
FIG. 1A is a functional block diagram of an embodiment of an image processing apparatus.

In wireless telephones having a camera capability, the choice of the lens and accompanying sensor can markedly affect the cost of the wireless phone and the image quality that can be captured with the camera. typically, the lens and sensor implemented within a phone are physically small in order to maintain the small dimensions expected of a wireless phone.

The lens roll-off or shading problem is a common problem for cameras with a small lens. For mobile applications, the lens roll-off problem is particularly severe because of the small size and low quality lens. The common roll-off problem is the image brightness near the corners is lower than the center. Additionally, a captured image may show color tone shift. Due to the lens mounting inaccuracy, the optical center of the lens is often not aligned with the image center, causing the image to show asymmetric brightness roll-off between two opposite corners.

The photo diode structure of the sensor is also a factor for the darker pixels near the edge of the image. Some sensors are designed to have a relatively deep and narrow opening that allows the light to come in to reach the photo diode area. In the center of the image, the light goes straight in, but the light goes into the photo diode opening in an angle for corner pixels. Due to the tunneling effect, the amount of light that reaches the photo diode is reduced. Therefore, the pixels near the boundary of the image gets less light and the resultant boundaries of the image appear darker.

Ideally, when capturing an image of a uniformly illuminated flat field scene, the image should look uniform across the image. However, due to the lens roll-off problem, the captured image looks brighter in the center and darker near the corners. Depending on the quality of the lens, captured images may also suffer from color tone shift. The Red, Green and Blue light components can encounter different degrees of attenuation when traveling through the lens.

The electronic device integrating the digital camera, in this example a wireless telephone, can correct for the roll-off characteristics using digital processing. The degradation introduced by lens roll-off can be corrected by processing the captured image. To correct for lens roll-off, the signal degradation of the lens can be measured and an inverse of the signal degradation applied to captured images.

To allow the characteristics of the lens and the correction factors to be computed in a reasonable amount of time in a device such as a wireless telephone, the characterization and correction can each include some simplifications that have relatively small effects on the resultant image quality.

A basic assumption that can be implemented in the characterization of lens roll-off degradation is that the lens is radially symmetric. It may be assumed that the degradation in the horizontal direction is the same as the degradation in the vertical direction. This is a very reasonable assumption because, typically, a lens with unequal degradation in different direction is considered as unacceptable or defective.

The lens roll-off degradation can be characterized by capturing an image of a uniformly illuminated flat field and sampling the image brightness as a function of a radius from an image center. The lens roll-off characterization can be repeated for each of red (R), green (G), and blue (B) image components. Alternatively, other color component configurations can be implemented, including YCbCr, YeMaCy, or some other color combination, which can be, for example, a three color combination or a four color combination.

Each of the lens roll-off characterizations can then be inverted and the inverse of the characterization used as a correction factor. To simplify the storage requirements for the correction factors, the inverse of the characterizations can be stored as a polynomial fit to the correction curve.

Alternatively, the captured image of the uniformly illuminated flat field can be divided into a number of blocks, such as a number of rectangular blocks. The lens roll-off degradation can be characterized by determining an average R, G, and B value for each of the blocks. The values can be normalized to a block substantially aligned with the center of the lens. A correction factor for each of the blocks can be determined by inverting the normalized degradation characterization values.

The number of blocks used to characterize the lens roll-off degradation can be predetermined or can be determined based in part on the measured lens roll-off response. If the number of blocks is variable, the number of blocks may be determined by imposing a constraint on an acceptable differential for correction factors of adjacent blocks.

FIG. 1A is a functional block diagram of an electronic device 100, for example a wireless phone, having a digital camera and configured to correct for lens roll-off. The electronic device 100 includes a lens 110 positioned relative to a sensor 120, for example an optical sensor, that can be configured to convert incident light into electronic representations. For example, the sensor can be a Charge Coupled Device (CCD), CMOS detector, photodiode array, photovoltaic detector, and the like, or some other sensor for capturing an optical image. The sensor 120 can be configured to generate the electronic representation in the form of light components. For example, the sensor 110 may generate distinct R, G, and B representations for the captured image.

The output of the sensor 120 can be coupled to an image processor 130 that can be configured to correct for image degradation contributed by lens 110 roll-off. As will be discussed in further detail below, the image processor 130 can be configured to measure or otherwise determine a lens 110 roll-off characteristic. The image processor 130 can determine a correction based in part on the inverse of the lens 110 roll-off characteristic. The image processor 130 can be configured to apply the correction to images subsequently captured using the sensor 120 to generate corrected images.

The image processor 130 can be configured to store the correction in memory 140 and may also be configured to store the captured images or the corrected images in the memory 140. Alternatively, or additionally, the image processor 130 can be configured to communicate the corrected image to an output/display 150. The output/display 150 can include a display device, such as a LCD, a LED array, a CRT, and the like, or some other display device. The output/display 150 can also include one or more output ports. For example, the corrected images can be output to a port or connector. The image processor 130 can be configured to output a corrected image directly to the output/display 150 or may be configured to convert the corrected image to a particular format, such as a standard display or file format prior to communicating the corrected image to the output/display 150. The output/display 150 may be a communication device, such as a modem or wireless transceiver configured to transmit the corrected image to a destination device (not shown).

Figure 1B:
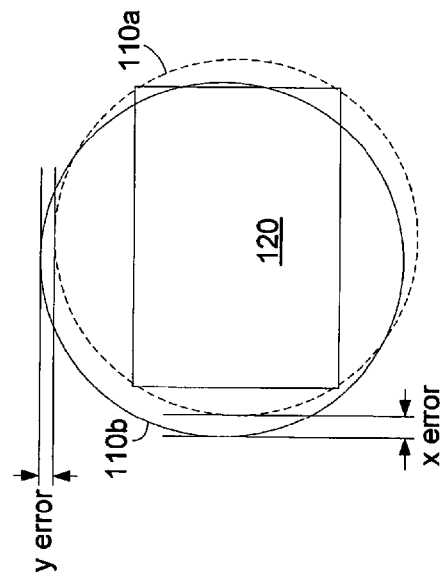
FIG. 1B is a block diagram showing an example of lens misalignment.

FIG. 1B is a diagram showing an example of lens, for example 110b, misaligned relative to a sensor 120. An ideally positioned lens 110a includes a center that coincides with the center of the sensor 120 . However, because of imprecision in the manufacturing process, the position of the lens 110b is typically offset from the ideally located lens 110a. The result of the imprecision is an offset that can include an offset in an x-direction as well as an offset in the y-direction. If the lens 110b roll-off degradation is radially symmetric, the effect of the misalignment is to offset the radial symmetry of the lens roll-off degradation from the center of the sensor 120.

Figure 2:
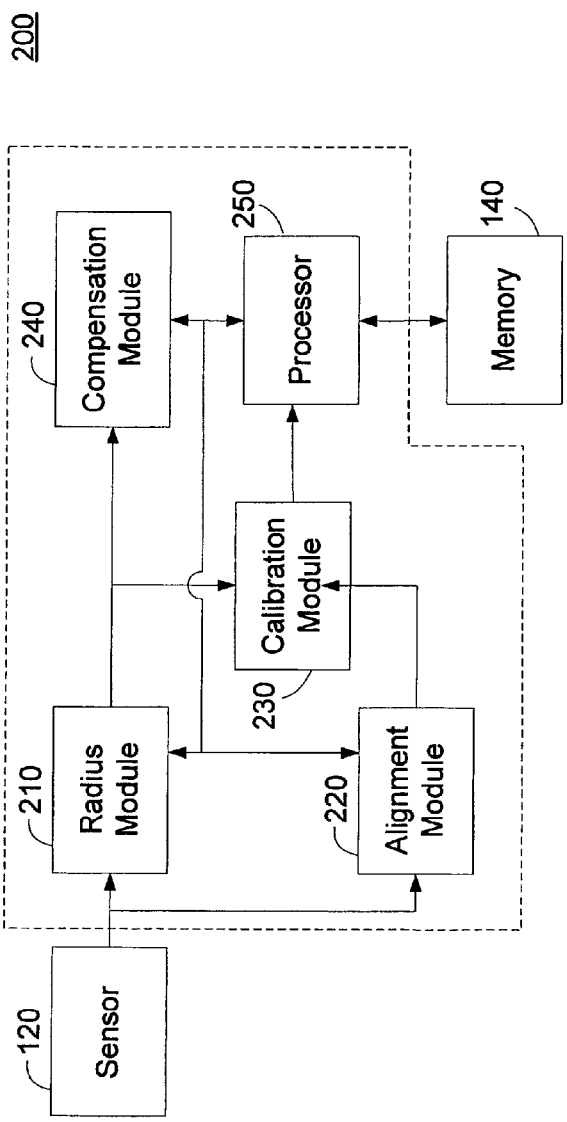
FIG. 2 is a functional block diagram of an embodiment of a portion of a image processing apparatus.

FIG. 2 is a functional block diagram of an embodiment of a lens roll-off correction module 200 of an image processing apparatus coupled to a sensor 120 and memory 140. The lens roll-off correction module 200 can be, for example, a portion of the image processor 130 of FIG. 1A.

The lens roll-off correction module 200 can include a radius module 210 and alignment module 230 coupled to an output of the sensor 120. The output of the radius module 210 and the alignment module 220 can be coupled to a calibration module 230. The alignment module 220 can also be coupled to the radius module 210.

Outputs from the radius module 210 and the calibration module 230 can be coupled to a compensation module 240 configured to determine and apply a correction to an image captured by the sensor 120. Each of the radius module 210, alignment module 220, calibration module 230 and compensation module 240 can be coupled to a processor 250 and associated memory 140. Some or all of the functions of the modules may be performed in combination with, or entirely by, the processor 250 operating on one or more processor usable instructions and data stored in memory 140.

The lens roll-off correction module 200 can be configured to determine a lens roll-off characteristic from a uniformly illuminated flat field image, and from that characteristic determine a correction factor that can be applied to subsequent captured images to compensate or otherwise correct for the lens roll-off. The radius module 210 can be used to determine a radius, or a measure based on the radius of a pixel from a center of the lens. In one embodiment, the radius module 210 can be configured to determine a radius of a pixel from a center of the lens. In another embodiment, the radius module 210 can be configured to determine a value of the radius squared for a pixel.

The alignment module 220 can be used to compensate for the lens misalignment. Thus, during calibration, the alignment module 220 can determine the actual center of the lens from the flat field image having uniform illumination. In one embodiment, the center of the lens can be determined by capturing the flat field image and determining a maximum brightness corresponding to the center of the lens. In other embodiments, the lens misalignment may be sufficiently small such that it may be ignored. In such embodiments, the alignment module 220 may be omitted.

The alignment module 220 can communicate the center of the lens information to the calibration module 230 and can also communicate the center of the lens information to the radius module 210.

The radius module 210 can determine for each pixel in a captured image, a radius or other measure based on radius, such as radius squared. The radius module 210 can also be configured to determine a maximum radius or measure based on the location of the offset lens center determined by the alignment module 220. For example, if the alignment module 220 determines that the center of the lens is offset from the actual center of a sensor 120 by some predetermined amount, the radius to the corners of the sensor 120 are not equal. Instead, the radius to one of the sensor 120 corners may represent a maximum radius. Such maximum radius information may be used by the calibration module 230 in determining the number of samples used to determine a lens roll-off characteristic.

The calibration module 230 can be configured to determine the lens roll-off characteristic and determine a correction that can be applied to subsequent captured images. In one embodiment, the calibration module 230 can determine a correction that can be applied to pixels of subsequent captured images based on a radius of the pixel location from the center of the lens. In another embodiment, the calibration module 230 can be configured to divide the captured image into a plurality of blocks and determine a correction that can be applied on a block by block basis. Each of these embodiments, and some variations on these embodiments, are described in further detail below.

In the embodiment in which the calibration module 230 determines corrections that are applied to pixels based in part on their radius relative to a center of the lens, corresponding to the image center, the calibration module 230 initially determines a lens roll-off characteristic based on the uniformly illuminated flat field image. The calibration module 230 can be configured to sample the brightness levels in many concentric circles around the image center to determine a brightness level vs. radius characteristic based on the uniformly illuminated flat field image. The calibration module 230 can be configured to generate a characteristic for each color component, for example, R, G, and B.

Figure 4B:
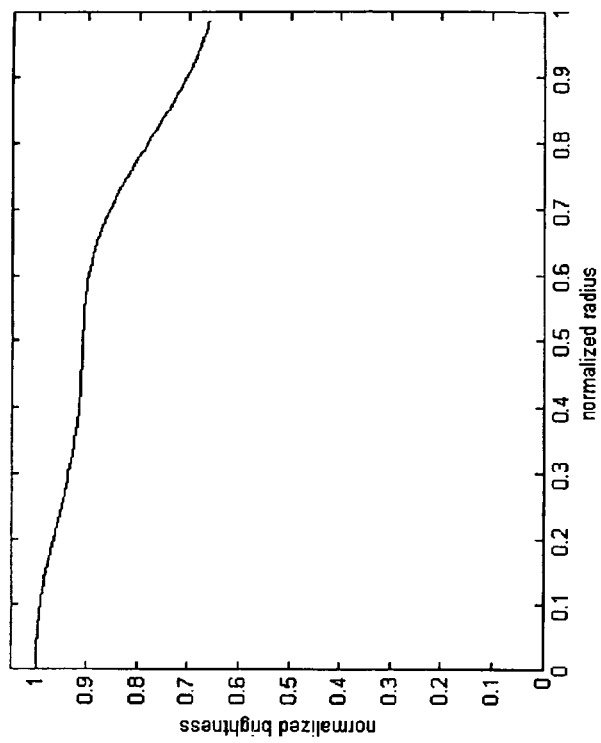
FIGS. 4A-4B are graphs of examples of lens roll-off characteristics.
Figure 4A:
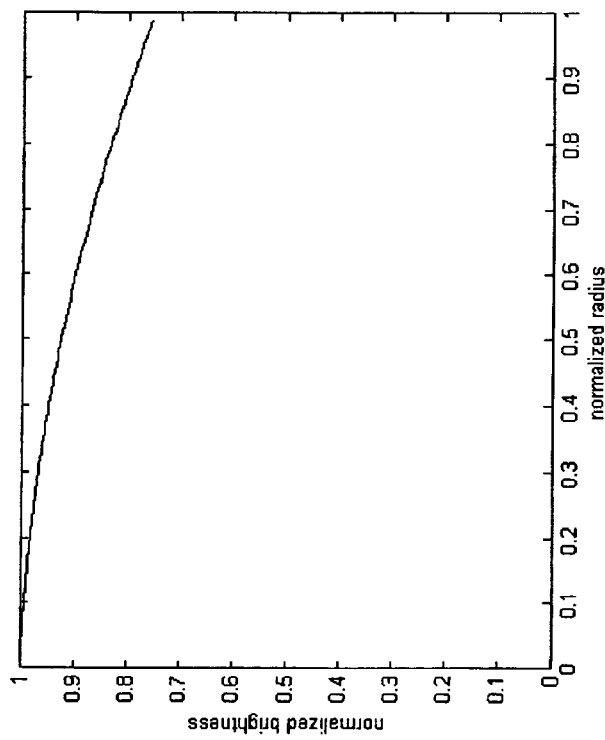

The calibration module 230 can be configured to normalize the brightness values relative to the brightness at the image center. Similarly, the calibration module can be configured to normalize the radius to the maximum radius. Of course, such normalization is not used nor required in all embodiments. FIG. 4A represents an example of a lens roll-off curve 400 for a lens with relatively good optical characteristics. The degradation curve 400 is monotonic decreasing and can be closely approximated by a lower order polynomial. However, for lower quality lenses, the degradation curve may not be a monotonic decreasing function, and may not be easily approximated by a low order polynomial. FIG. 4B shows an example of lens roll-off degradation curve 410 of a low quality lens.

The calibration module 230 can then determine a correction based on the measured lens roll-off degradation. The lens roll-off can be corrected by multiplying every pixel with a digital gain so to increase the brightness level of darker pixels. In one embodiment, the calibration module 230 can be configured to determine a polynomial fit for the lens roll-off degradation and invert the polynomial to determine a correction polynomial. If the calibration module 230 determines the lens roll-off for each color component, the polynomial fit and correction polynomial can be determined for each of the color components.

In another embodiment, the calibration module 230 can generate a matrix based on the sampled brightness values and can invert the matrix to determine a correction polynomial. If the center of the image is designated as $(w_c, h_c)$ and the image from the sensor 120 has the dimension of w×h, the radius of a pixel at point (x,y) relative to the center is given by equation (1) where $0 \leq x < w$ and $0 \leq y < h$.

$$r = \sqrt{(x-w_c)^2 + (y-h_c)^2} \quad (1)$$

Let I be the undistorted pixel value for a perfect lens and the I' be the distorted pixel value due to inferior lens. The value I and I' have the following relationship:

$$I' = I*(a_0 + a_1 r + a_2 r^2 + a_3 r^3 + \ldots) \quad (2)$$

Due to the attenuation, the value I' is always somewhat smaller than I. Expressing the equation (2) in matrix form and moving I to the left, the normalized attenuation, V, is given by equation (3).

$$V = \frac{I'}{I} = [a_0 \; a_1 \; a_2 \; \ldots \; a_n] \begin{bmatrix} 1 \\ r \\ r^2 \\ r^3 \\ \vdots \\ r^n \end{bmatrix} = A \cdot R \quad (3)$$

The value of V is a 1×1 scalar, A is a row vector of 1×(n+1), R is a column vector of (n+1)×1 and n is the order of the polynomial.

If the test image is the scene of an evenly illuminated uniform object, the pixel value in the center can be used as I for each pixel. When scanning across the whole image, equation (3) can be expanded accordingly. Assume there are M pixels available to estimate the coefficients, V is then a matrix of 1×M, A is a matrix of 1×n and R is n×M. In practice, the condition M>>n is satisfied to find the pseudo inverse of the matrix R. The vector A can be found to be $$A = VR^T(RR.^T)^{-1} \quad (4)$$

To correct the lens roll-off, a reverse operation is applied. That is $$I = \frac{I'}{A \cdot R} \quad (5)$$

Note that matrix A has been obtained beforehand, and for each pixel with coordinate (x,y) the matrix R can be calculated using equation (1). In practice, three different sets of A's are determined corresponding to one matrix A for each color. Therefore, the color tone shift is addressed by applying the three matrices to each pixel in the captured image.

The strength of the matrix embodiment is that there is no noticeable artifact introduced to the corrected image and it requires only the storage space for the polynomial coefficients, which can typically be as few as three coefficients. The disadvantage of the polynomial embodiment is the computation complexity. Each pixel requires 1 square root operation, 2 subtractions, 2 multiplications and 1 addition to compute the radius r. Then 1 division, 2 additions and 3 multiplications to compute the corrected pixel value for a second order polynomial. For Mega-pixel sensors, the radius r can be in the range of 0 to $10^3$, and the value of $r^2$ can be in the range of 0 and $10^6$. Additionally, the coefficients of $a_1$ and $a_2$ can be very small (<<1). Therefore, the implementation may require arithmetic operation with large dynamic range.

Figure 5:
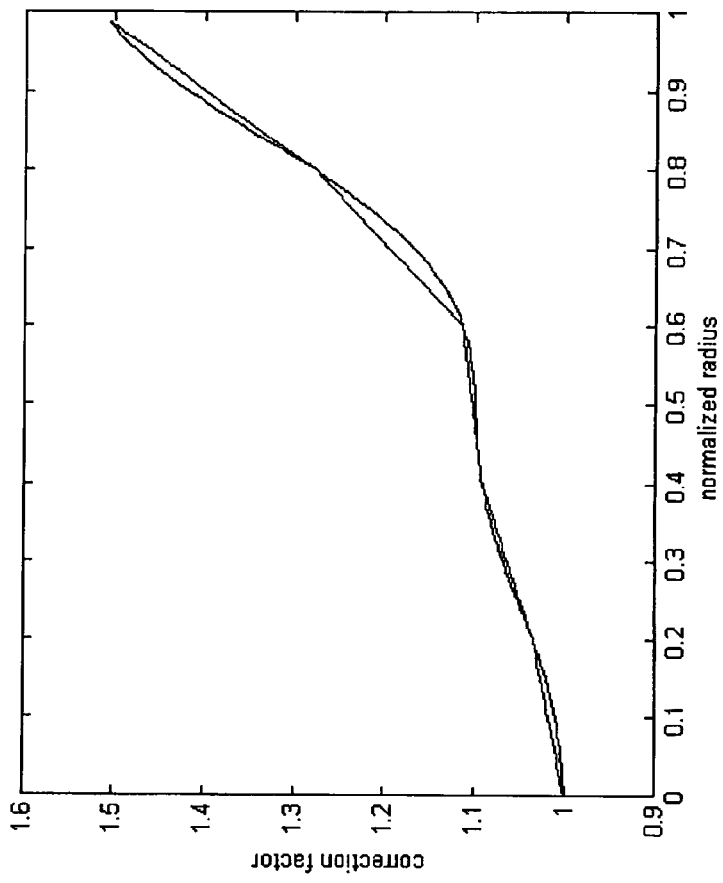
FIG. 5 is a graph of an example of a correction curve for one embodiment.

In another embodiment, rather than computing the inverse of the lens roll-off curve, the calibration module 230 can determine the lens correction curve by determining the reciprocal of the lens degradation curve. For example, if a pixel at radius r has a normalized brightness of 0.8, it requires a digital gain of 1/0.8=1.25 to increase its brightness level to that of the center of the image. For the degradation curve shown in FIG. 4B, the corresponding correction curve is shown in FIG. 5.

The calibration module 230 can further simplify the determination of the correction by performing piecewise linear approximation to the lens roll-off correction factors, rather than approximating the correction curve with a polynomial. The calibration module 230 can be configured to divide the maximum radius of the image into several intervals and determine a correction factor and the slope for each interval. The calibration module 230 can then be configured to store the correction factors corresponding to the interval values. The compensation module 240 can then be configured to determine the correction factor for any pixel by linear interpolation. Alternatively, the calibration module 230 can be configured to store an interval value and an associated slope. The compensation module 240 can determine a correction factor based on the slope and interval value with the largest radius value that does not exceed the pixel radius. FIG. 5 shows the piecewise linear approximation of the correction curve with a number of intervals equal to five. As the number of intervals increases, the approximation error decreases.

The calibration module 230 can further simplify the determination of a correction factor by determining a correction factor relative to a radius squared value. Then the compensation module 240 can be simplified to omit the square root operation used in determining a pixel radius. The calibration module 230 can store a correction factor table for each color component.

The compensation module 240 can then determine a correction factor based on radius squared and a slope between intervals of the linear approximations. The compensation module 240 can be configured to multiply each pixel with the correction factor to remedy the lens roll off effect. Because each color component can have a corresponding correction factor table, the hue shift problem can be corrected as well.

Therefore, the compensation module 240 can reduce computation complexity using piecewise linear approximation of the curve with the help of lookup tables. First, the radius can be equally divided into N intervals from 0 to r_max, where r_max is the distance from the corner of the image to its center. Let r_delta=(r_max/(N−1)), an array of various radii is formed, ranging [0, r_delta, 2*r_delta, . . . , r_max]. The square of these radii can be used to populate an r_square table. The compensation module 240 can use the r_square table to determine an interval a pixel falls in when the picture is scanned. By using the r_square table, the computation of square root (to find r from $r^2$) can be avoided. At each of these points, the correction factor can be pre-calculated and stored in a cf table. Between each pair of points on the curve, a line segment can be used to approximate the curve. Since these points are already chosen and known, slope can be computed to further facilitate the linear interpolation for any point between the point pairs. Therefore, for each pixel, the r_square table can be used to determine which interval the pixel falls into. Let the interval be k. The correction factor cf can be computed by the following formula.

$$cf = slope\_table[k]*(r^2 - r\_quare\_table[k]) + cf\_table[k]$$

Each pixel can be multiplied with the correction factor cf to remedy the lens roll off effect. Each color channel can have a corresponding table so that the hue shift problem can be corrected simultaneously.

The number of intervals, N, does not have to be large. Even for 4 megapixel sensors, N=16 or 32 should be large enough to approximate the roll-off curve pretty well. For image sensor up to 6 mega pixels, it has been found that 32 intervals are sufficient to approximate the lens correction curve without visually noticeable errors. Of course, the number of intervals can be some other number, and can be, for example, 4, 8, 16, 32, 64, 126 or 256, and does not need to be a factor of 2.

In a hardware implementation, fixed point computations may be advantageous due to cost savings and increased speed. For a radius squared correction factor table, the radius squared values can range from 0 to 2047396 for a 4 megapixel sensor with the size of 2272×1740. This level of dynamic range requires an entry having 21 bits. The final correction factor that will be multiplied on the pixel is a number $\geq 1$. The upper bound depends on the lens degradation. The upper bound can be approximately 1.6. However, experiments show that if the numerical precision is not sufficiently large, a ringing effect can be observed in the corrected image. It may be advantageous to use at least 8 bits to represent the fractional part of the correction factor. In one embodiment, the total bit width for the correction factor can be implemented as 10-bit number where 2 bits are used to represent the integer part while the 8 bits are used to represent the fractional part.

In another embodiment, the calibration module 230 can be configured to perform block based correction. Human eyes are not sufficiently sensitive to detect a slight change in color or luminance between two adjacent pixels if the difference is sufficiently small. This fact allows a block-based correction method to work. In the block based configuration, the radius module 210 can be omitted.

The calibration module 230 divides the image space into a number of blocks. Although the blocks are not required to have the same size, it may be advantageous to use uniform block sizes. The calibration module 230 can be configured to determine an average brightness value for each block. Again, the calibration module 230 can be configured to determine an average brightness value for each of the color components. The calibration module 230 can also normalize the values to an average brightness value of the block having the center of the image. The correction factor for the block is then determined as the reciprocal of the normalized brightness for the block. The calibration module 230 can be configured to store a correction factor for each color component of each block. The compensation module 240 can then correct a captured image by determining which block a pixel falls and multiplying the pixel by the correction factor from the calibration table.

If the calibration module operates on a predetermined number of blocks, or if the number of blocks is insufficient to produce only small changes between correction factors of adjacent blocks, the corrected image may include artifacts contributed by block correction that result in the corrected image appearing as distinct blocks. The blockiness can occur if the differential between correction factors is not constrained to be within a predetermined minimum perceivable threshold. Such an embodiment may be referred to as an unconstrained block correction approach. The gain steps between adjacent blocks exceed the threshold which human eyes can detect the difference. Also, the variation of pixel values in the same block may be sufficiently large to be perceivable. When the lens is poor, the blockiness can appear in the corrected image.

One way to improve on the unconstrained block correction method is to apply a constraint on the gains for each block. The same constraint can apply to all three color gains (the gains for R, G and B). When the lens is poor, the block size can be reduced so that the pixels within the same block differ less than perceivable difference.

The block size is inversely proportional to the lens quality. With a good lens, the block size can be bigger, thus the calibration module 230 requires less memory to store the gains for the whole image. As the roll-off phenomenon deteriorates, smaller blocks are needed to avoid perceivable blockiness, thus, the calibration module 230 requires larger memory space to store the gains. Also note that for relatively poor lenses, the constrained block-based method may not be able to completely compensate for the brightness roll-off near the edge because the constraint can limits the rate of compensation.

Figure 3:
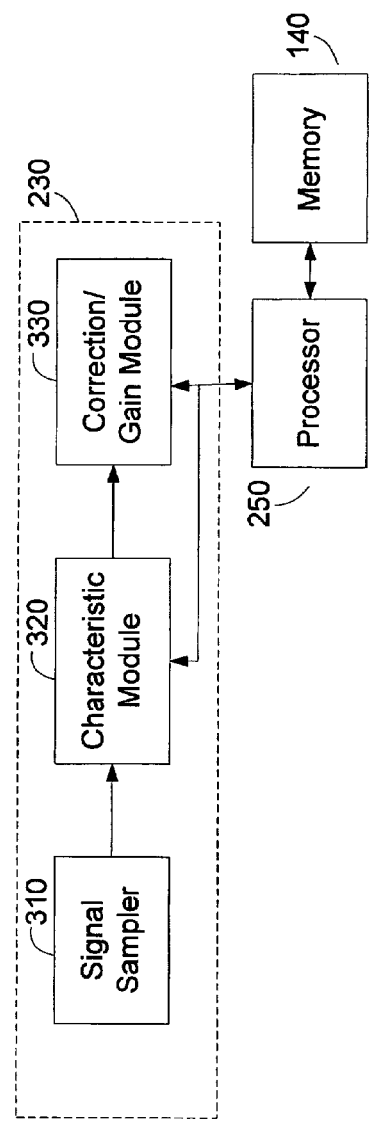
FIG. 3 is a functional block diagram of an embodiment of a calibration module within an image processing apparatus.

FIG. 3 is a functional block diagram of an embodiment of a calibration module 230 operating in conjunction with a processor 250 and memory 140 to perform one of the calibration method described above.

The calibration module 230 can include a signal sampler 310 that can be coupled to a characteristic module 320. In the polynomial based configuration, the signal sampler 310 can be configured to select one or more pixels from the flat field image based in part on the radius of the pixel from the image center. In the block based configuration, the signal sampler 310 can be configured to determine a block corresponding to each pixel from the flat field image.

The characteristic module 320 determines the appropriate image characteristic based on the correction configuration. For the polynomial configuration, the characteristic module 320 can be configured to determine the pixel brightness or lens roll-off relative to the center of the image. The characteristic module 320 can be configured to determine the lens roll-off for a sufficient number of pixels to determine a lens roll-off characteristic curve.

For the block based configuration, the characteristic module 320 can be configured to determine the average brightness of each block. The characteristic module 320 can be configured to use a predetermined number of blocks or can be configured to determine a number of blocks and block size based in part on a predetermined gain differential constraint.

The characteristic module 320 can be coupled to a correction or gain module 330. The gain module can be configured to determine the gain or correction table values that are to be stored in memory 140.

The polynomial-based method can provide the best correction result without introducing artifacts into the corrected image. The polynomial-based method can require as few as three parameters for each color channel. Thus, the gain module 330 can determine and store as few as a total of nine parameters for the entire image area. However, the computation complexity and the requirement of arithmetic units with large dynamic range make this approach expensive to implement. For a real-time application, hardware is probably the only candidate for implementation. Software implementation may be more suitable as a post processing option.

The unconstrained block method can require as few as one multiplication for each pixel, and thus, can be the most cost efficient method to implement. However, the method may only be satisfactory for a camera with relatively good lens. As the lens quality gets worse, the unconstrained block method can introduce unacceptable artifact of blockiness into the corrected image. Both hardware and software may be used to implement this method in a real-time application. Hardware is particularly efficient and straightforward for implementing this correction method. For a cell phone application, an inexpensive relatively low quality lens is used prevalently. Therefore, the unconstrained block-based method may not be the preferred correction method.

The constrained block-based method can also require as few as one multiplication for each pixel for typical Bayer pattern images. Therefore, it is the same complexity as unconstrained block-based method in terms of computation complexity and implementation. In order to avoid blockiness, the compensation effect is limited. Because the block size is typically smaller for poorer quality lenses, a large memory storage may be needed to hold the color gains for all the blocks of a poor quality lens.

Figure 6:
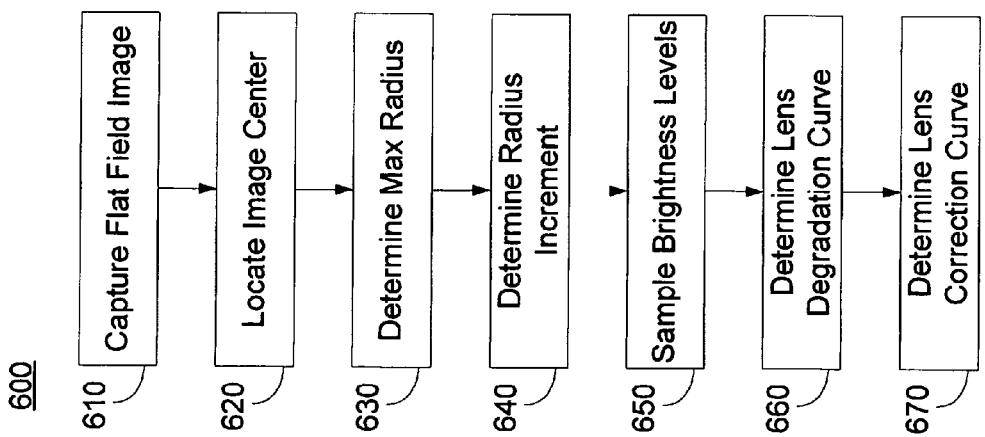
FIG. 6 is a flowchart of an embodiment of a lens roll-off calibration method.

FIG. 6 is a flowchart of an embodiment of a polynomial-based lens roll-off calibration method 600. The method 600 can be performed, for example, by the electronic device 100 of FIG. 1 using the image processor 130 of FIG. 1 or the lens roll-off correction module 200 of FIG. 2. The calibration method 600 is typically performed at the manufacturer and is not performed by the end user.

The method 600 begins at block 610 where the electronic device initially captures a uniformly illuminated flat field image. The electronic device then proceeds to block 620 and locates the center of the image. The electronic device can locate the center of the image using, for example, an alignment module that determines an image center based on the brightness of the image. In some embodiments, the misalignment of the lens may be insignificant and the center of the image can be assumed to be the center of the sensor array. For example, the calibration method 600 may be insensitive to lens offsets that are less than approximately 10% of the dimension of the sensor array.

The electronic device proceeds to block 630 and determines a maximum radius based in part on the image center and the configuration of the pixels in the sensor. If the image center is assumed to be the center of the sensor, the maximum radius is fixed and can be predetermined.

The electronic device proceeds to block 640 and determines a radius increment to use when sampling lens roll-off values. The lower bound for the increment is the smallest radius increment based on the array dimensions, while the upper bound is represented by the maximum radius. Advantageously, the number of increments exceeds the number of intervals if piecewise continuous approximations are used.

The electronic device proceeds to block 650 and samples the brightness levels at the radius increments. The brightness levels for each of the color components can be sampled. The electronic device proceeds to block 660 and determines a lens degradation curve based on the samples. In some embodiments, the electronic device determines a polynomial curve fit to the samples. In another embodiment, the electronic device forms a matrix based on radius and attenuation values.

The electronic device then proceeds to block 670 and determines the lens correction curve, or in other words, determines the correction factors or basis for the correction factors. In one embodiment, the electronic device determines an inverse of the polynomial fit to the lens roll-off curve. In another embodiment, the electronic device determines the reciprocal of each of the samples in the roll-off curve and determines a correction curve that can be a polynomial fit to the reciprocal values. In another embodiment, the electronic device determines the reciprocal of each of the samples and determines a number of piecewise continuous approximations, with each approximation spanning a predetermined interval. The piecewise continuous approximations can be, for example, piecewise continuous polynomials or linear approximations. The electronic device need not determine every possible correction factor, but can be configured to determine a basis for the correction factor. The basis for the correction factor can be, for example, polynomial coefficients, interval values and slopes, interval values and polynomial coefficients, or some other basis. The electronic device can store the correction factors or basis for the correction factors in memory for use by a compensation module.

In another embodiment, the electronic device, in block 670, can generate the lens correction curve for each color channel by taking the reciprocal of the degradation curve. The electronic device can then define a number of intervals N for performing piecewise correction. The value of N should be less than the number of samples (M) used to generate the correction curve. While N is greater than M, the electronic device can search the point where the omission of a sampling point causes the least amount of error. When a sampling point is omitted, M is incremented by 1. Based on the N intervals, the electronic device generates a radius square table, correction factor table and slope table for each color channel.

At the end of the calibration process, there is a radius square table which has N+1 entries. Each of the entries records the sampling point on the radius square domain. For each color channel, there is a correction factor table of N entries for each sampling point and a slope table of N entries for each interval between two sampling points.

Figure 7:
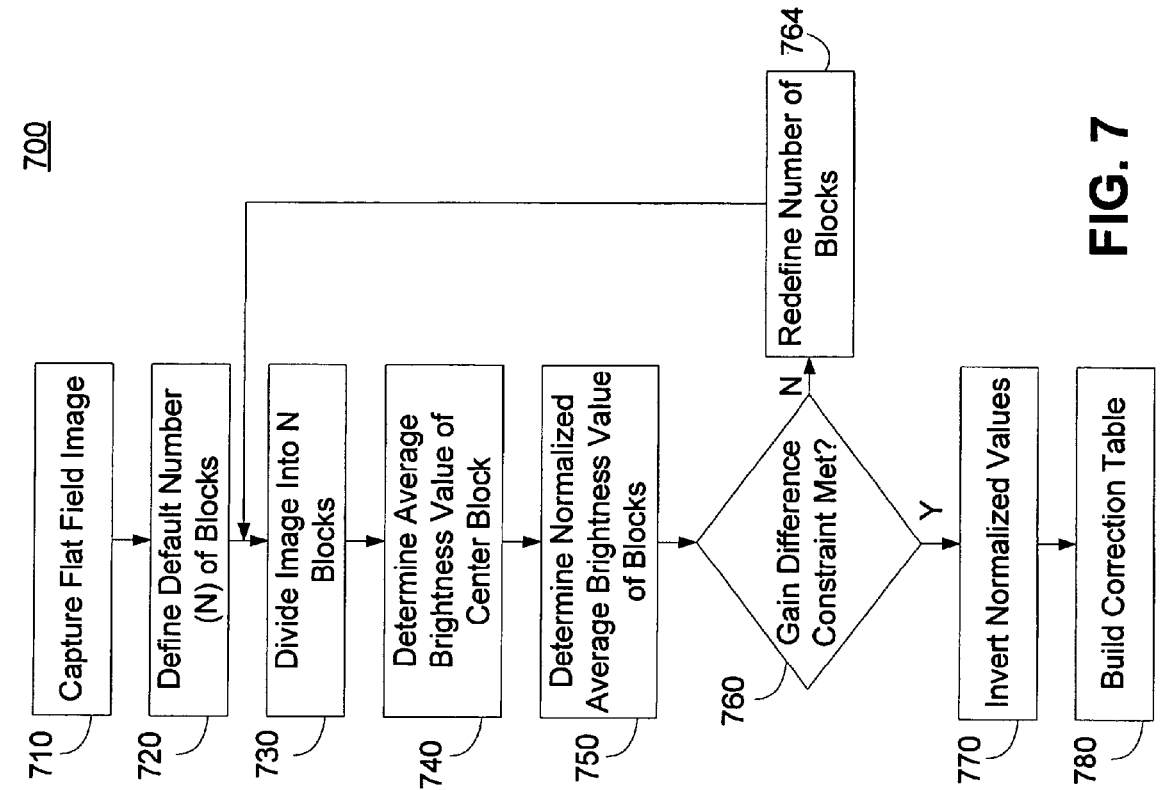
FIG. 7 is a flowchart of an embodiment of a lens roll-off calibration method.

FIG. 7 is a flowchart of an embodiment of a block-based lens roll-off calibration method 700. The method 700 can be performed, for example, by the electronic device 100 of FIG. 1 using the image processor 130 of FIG. 1 or the lens roll-off correction module 200 of FIG. 2.

The method 700 begins at block 710 where the electronic device initially captures a uniformly illuminated flat field image. The electronic device proceeds to block 720 and defines a default number of blocks. The electronic image proceeds to block 730 and divides the flat filed image into the predetermined number of blocks.

The electronic device then proceeds to block 740 and determines an average brightness value for a center block. The center block can be defined as the block including the center of the image.

The electronic device proceeds to block 750 and determines the average brightness of each of the blocks and can be configured to normalize the value with the value determined for the center block. As discussed above, the electronic device can be configured to determine a value for each color component of each block.

The electronic device proceeds to decision block 760 and verifies that a gain difference between adjacent blocks conforms to a predetermined differential threshold. In one embodiment the gain constraint is verified for all blocks. In another embodiment, the constraint may be satisfied if a predetermined percentage of blocks satisfies the constraint.

If the constraint is satisfied, the electronic device proceeds to block 770 and determines the reciprocal of each of the normalized roll-off values to determine the gain value. The electronic device then proceeds to block 780 and builds the correction tables from the gain values. The gain values can be determined prior to decision block 760. If so, the electronic device can proceed from decision block 760 to block 780 if the constraint is satisfied.

Returning to decision block 760, if the gain difference constraint is not satisfied, the electronic device proceeds to block 764 and redefines the number of blocks to be greater than the present number of blocks. For example, the electronic device can be configured to double the number of blocks each time the differential gain constraint is not satisfied. The electronic device then proceeds to back to block 730 to recomputed the block averages using the new number of blocks.

Figure 8:
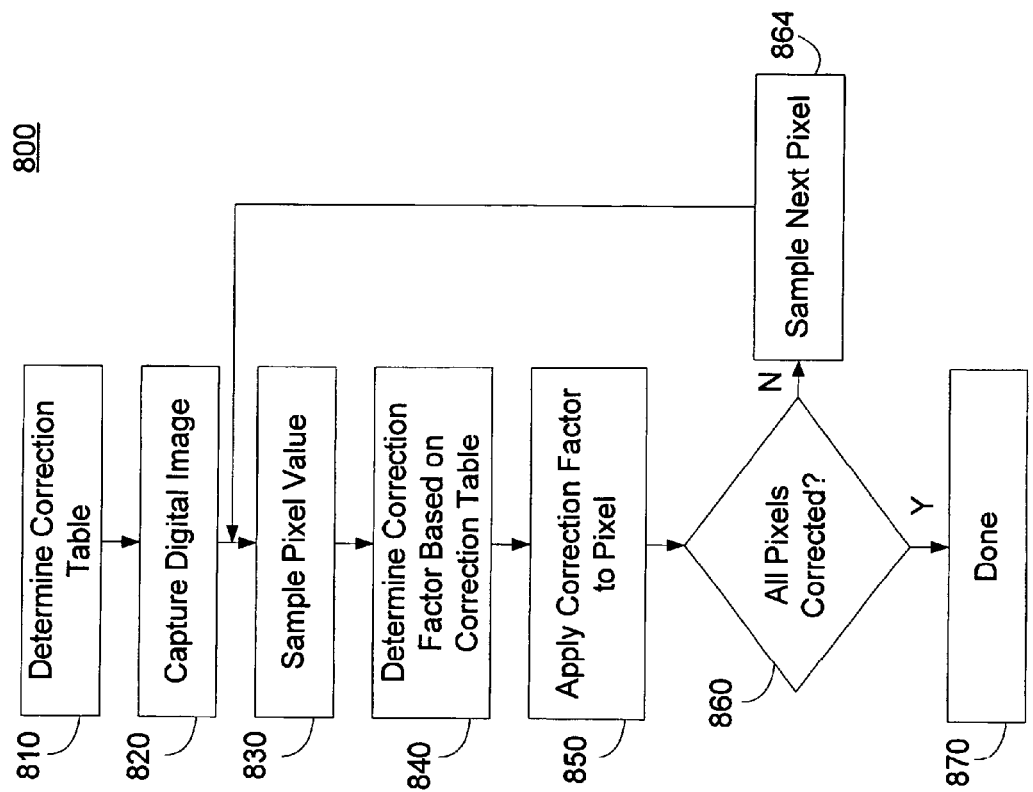
FIG. 8 is a flowchart of an embodiment of a lens roll-off correction method.

FIG. 8 is a flowchart of an embodiment of a method 800 of correcting for lens roll-off in an electronic device, such as a wireless or cellular telephone having a digital camera. The method 800 begins at block 810 where the electronic device determines a correction table. The correction table can be determined using, for example the calibration methods of FIG. 6 or FIG. 7. After determining the correction table, the electronic device proceeds to block 820 and captures a digital image. The electronic device can store the captured image in memory.

The electronic device proceeds to block 830 and samples a pixel value. The electronic device proceeds to block 840 and determines a corresponding correction factor based on the correction table. The electronic device then proceeds to block 850 and applies the correction factor to the pixel. The electronic device proceeds to decision block 860 and checks to see if all pixels have been corrected. If so, the electronic device proceeds to block 870, the corrected image has been determined, and the electronic device is done. If, at decision block 860, the electronic device determines that not all pixels have been corrected, the electronic device proceeds to block 864 and samples a next pixel value. The electronic device then proceeds to block 840.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of correcting lens roll-off degradation, the method comprising:
   determining a brightness of an image corresponding to a center of the image;
   determining an offset distance between a center of an image sensor and a center of a lens;
   identifying a farthest corner of the image sensor relative to the center of the image, from among a plurality of corners of the image sensor;
   identifying a radial distance from the center of the image to the identified farthest corner of the image sensor, wherein the center of the image is offset from the center of the image sensor by the offset distance;
   using the radial distance to determine a number of sample entries to be generated for a correction table;
   generating sample entries for the correction table; and
   correcting the lens roll-off degradation of another image based in part on the correction table, wherein the method is performed by one or more computing devices.

2. The method of claim 1, wherein the image comprises a uniformly illuminated flat field image.

3. The method of claim 1, wherein generating the correction table comprises:
   sampling at least one brightness level of the image at each of a plurality of radii; and
   generating the correction table based in part on the at least one brightness level at each of the plurality of radii.

4. The method of claim 3, wherein the at least one brightness level is sampled using a radius increment, wherein the radius increment has an upper bound based on the radial distance from the center of the image to the farthest corner of the image sensor, and wherein the radius increment has a lower bound based on an array dimension of the image sensor.

5. The method of claim 3, wherein the at least one brightness level comprises a brightness level corresponding to each of a plurality of color components.

6. The method of claim 3, wherein generating the correction table based in part on the at least one brightness level comprises:
   normalizing the at least one brightness level at each of the plurality of radii relative to the maximum brightness of the image to generate normalized brightness levels;
   determining a reciprocal of each of the normalized brightness levels to generate a plurality of gain levels;
   fitting a polynomial to at least two of the gain levels; and
   generating the correction table by storing at least one polynomial coefficient of the polynomial.

7. The method of claim 3, wherein generating the correction table based in part on the at least one brightness level comprises:
   normalizing the at least one brightness level at each of the plurality of radii relative to the maximum brightness of the image to generate normalized brightness levels;
   determining a reciprocal of each of the normalized brightness levels to generate a plurality of gain levels;
   determining a plurality of piecewise linear intervals based on the gain levels; and
   generating the correction table based on the piecewise linear intervals.

8. The method of claim 3, wherein generating the correction table based in part on the at least one brightness level comprises:
   normalizing the at least one brightness level at each of the plurality of radii relative to the maximum brightness of the image to generate normalized brightness levels;
   fitting a polynomial to at least a portion of the normalized brightness levels;
   determining an inverse of the polynomial; and
   generating the correction table based on coefficients of the inverse of the polynomial.

9. A method of correcting lens roll-off degradation, the method comprising:
   capturing a flat field image at an image sensor with a lens;
   determining an offset distance from a center of the lens to a center of the image sensor;
   identifying a farthest corner of the image sensor relative to the center of the image, from among a plurality of corners of the image sensor;
   determining a number of sample entries needed to populate a correction table, wherein the number of sample entries is determined at least partially based on a radial distance between the center of the flat field image and the identified farthest corner of the image sensor from the center of the flat field image;
   generating sample entries for the correction table;
   capturing a digital image;
   sampling a pixel value from the digital image;
   determining a correction factor based on the correction table, wherein the correction factor is determined at least in part based on the offset distance; and
   applying the correction factor to the pixel value, wherein the method is performed by one or more computing devices.

10. The method of claim 9, further comprising:
    sampling a distinct pixel from the digital image;
    applying a corresponding correction factor to the distinct pixel; and repeating sampling the distinct pixel from the digital image and applying the corresponding correction factor to the distinct pixel until all pixels in the digital image have been sampled.

11. The method of claim 9, further comprising:
determining a radius increment;
sampling brightness levels of the flat field image based on the radius increment; and
determining a lens correction based in part on the brightness levels.

12. The method of claim 11, wherein determining the lens correction comprises:
determining a gain value based in part on the brightness levels; and
generating the correction table having at least one gain value related to a radius.

13. The method of claim 11, wherein determining the lens correction comprises generating the correction table having at least one gain value corresponding to a radius squared value.

14. The method of claim 11, wherein determining the lens correction comprises generating the correction table having at least one polynomial coefficient.

15. A nontransitory processor readable medium containing processor executable instructions that are operative to cause a processor to:
identify the distance to a farthest corner of an image sensor relative to a center of an image, from among a plurality of corners of the image sensor;
determine a size for a correction table, wherein the size is determined based on the distance to a farthest corner, wherein the center of the image is offset from a center of the image sensor;
determine a correction table entry for each sampled point of a calibration image;
receive a digital image from a sensor;
sample a pixel value from the digital image;
determine a correction factor based on the correction table; and
apply the correction factor to the pixel value.

16. An apparatus configured to correct a lens roll-off degradation, the apparatus comprising:
a lens;
a sensor positioned relative to the lens and configured to capture an image incident to the lens; and
an image processor coupled to the sensor and configured to correct the lens roll-off by sampling pixels from the image, determining a correction factor corresponding to each of the pixels, and applying the correction factor to the pixels;
wherein the image processor comprises an alignment module configured to determine an offset between a center of the lens and a center of the sensor, and
wherein the image processor further comprises a radius module configured to identify a farthest corner of an image sensor relative to the center of the image, from among a plurality of corners of the image sensor;
receive the offset from the alignment module and to use the offset to determine a distance between the lens and a farthest corner of the sensor, and
wherein a calibration module coupled to the alignment module and configured to generate a correction table based in part on the center of the image and the offset, and store the correction table in a memory.

17. The apparatus of claim 16, wherein the sensor is selected from the group consisting of a CCD, a CMOS detector, a photodiode array, and a photovoltaic detector.

18. The apparatus of claim 16, wherein the image processor further comprises:
a compensation module coupled to the sensor and the memory and configured to determine the correction factor for a pixel based in part on the correction table.

19. The apparatus of claim 16, wherein the radius module is coupled to the sensor and is further configured to determine a measure based on a radius of a sampled pixel, and wherein the image processor determines the correction factor based in part on the measure based on the radius.

20. The apparatus of claim 19, wherein the measure based on the radius comprises a radius squared.

21. The apparatus of claim 19, wherein the measure based on the radius comprises a radius relative to a center of the image.

22. The apparatus of claim 16, wherein the image processor comprises:
a signal sampler configured to sample a plurality of pixel values from a calibration image;
a characteristic module coupled to the signal sampler and configured to determine a lens roll-off characteristic from the plurality of pixel values; and
a gain module coupled to the characteristic module and configured to generate a correction table based in part on the lens roll-off characteristic.

23. The apparatus of claim 16, further comprising a memory coupled to the image processor and configured to store a correction table, and wherein the image processor determines the correction factor based in part on the correction table.

24. The apparatus of claim 23, wherein the correction table comprises a plurality of polynomial coefficients characterizing a polynomial that estimates gain correction values relative to a measure of radius from the center of the image.

25. The apparatus of claim 23, wherein the correction table comprises a plurality of values characterizing a plurality of piecewise linear intervals that estimate gain correction values relative to a measure of radius from the center of the image.

26. An apparatus configured to correct lens roll-off degradation, the apparatus comprising:
a lens;
means for capturing an image from the lens; and
means for processing the image, coupled to the means for capturing the image, and configured to determine a correction value for each of a plurality of pixels in the image and apply the correction factor to the pixel;
wherein the means for capturing an image from the lens includes an image sensor, wherein a center of the lens is offset from a center of the image sensor,
wherein determining a correction value comprises identifying a farthest portion of the image sensor relative to the center of the image, from among a plurality of portions of the image sensor; and
wherein the correction value for each of the plurality of pixels is based at least in part on a number of samples of a calibration image, the number of samples determined based on a radial distance between the center of the image and the farthest portion of the image sensor from the center of the image.

27. The apparatus of claim 26, wherein the means for processing the image comprises:
means for sampling the plurality of pixel values from the calibration image;
means for determining a lens roll-off characteristic from the plurality of pixel values from the calibration image; and means for generating a correction table based in part on the lens roll-off characteristic.

28. An apparatus configured to correct lens roll-off degradation, the apparatus comprising:
- means for capturing an image;
- means for determining a radial distance between a brightest portion of the captured image and a farthest portion of the captured image using an offset of a center of a lens from a center of a sensor;
- means for generating a correction table having a number of entries, wherein the number of the entries is at least partially determined using the radial distance; and
- means for correcting the lens roll-off degradation of a subsequent image based in part on the correction table.

29. An apparatus configured to correct lens roll-off degradation, the apparatus comprising:
- means for identifying a farthest point of an image sensor relative to the center of a calibration image, from among a plurality of points of the image sensor;
- determining a radial distance between an offset center of the calibration image and the farthest point of the calibration image using an offset distance of a center of a lens from a center of a sensor;
- means for generating a correction table having a number of entries, wherein the number of the entries is at least partially determined using the radial distance;
- means for receiving a digital image;
- means for sampling a pixel value from the digital image;
- means for determining a correction factor based on the correction table; and
- means for applying the correction factor to the pixel value.

30. The apparatus of claim 26, wherein the farthest portion of the image sensor from the center of the image is a corner point.

* * * * *